United States Patent
Groebke

[11] 3,817,977
[45] June 18, 1974

[54] SUBSTITUTED PHENYL AZO NAPHTHYL DISPERSE DYES

[75] Inventor: Wolfgang Groebke, Oberwil, Basel, Switzerland

[73] Assignee: Sandoz Ltd., Basel, Switzerland

[22] Filed: Apr. 2, 1971

[21] Appl. No.: 130,773

[30] Foreign Application Priority Data
Apr. 10, 1970 Switzerland.................... 5329/70

[52] U.S. Cl. .............................................. 260/196
[51] Int. Cl............................................ C09b 29/06
[58] Field of Search..................................... 260/196

[56] References Cited
UNITED STATES PATENTS
2,045,324   6/1963   Felix et al. ................. 260/196 X
2,373,700   4/1945   McNally et al. ............. 260/196 X
3,598,802   8/1971   Weaver et al. ............... 260/196

Primary Examiner—Lorraine A. Weinberger
Assistant Examiner—Warren C. F.

[57] ABSTRACT

Azo compounds of low solubility in water and having the formula

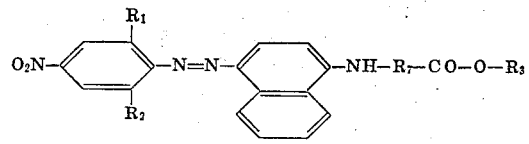

wherein
  $R_1$ is chloro, bromo, cyano or acyl,
  $R_2$ is cyano or nitro,
  $R_3$ is alkyl or aryl optionally substituted with nonwater solubilizing substituents, and
  $R_7$ is alkylene of two to four carbon atoms. These compounds are highly suitable as disperse dyes for dyeing and printing fibres, yarns and textiles whice consist of or contain synthetic or semi-synthetic organic substances of high molecular weight and hydrophobic character. The dyeings obtained are outstandingly fast to light, sublimation and wet treatments.

10 Claims, No Drawings

SUBSTITUTED PHENYL AZO NAPHTHYL DISPERSE DYES

This invention relates to azo compounds of the 1-(4'-alkyl-aminonaphthylazo)-4-nitrobenzene series of low solubility in water, which are highly suitable as disperse dyes for dyeing and printing fibres, yarns and textiles which consist of or contain synthetic or semi-synthetic organic substances of high molecular weight and hydrophobic character. The dyeings obtained are outstandingly fast to light, sublimation and wet treatments.

The new dyes correspond to the formula

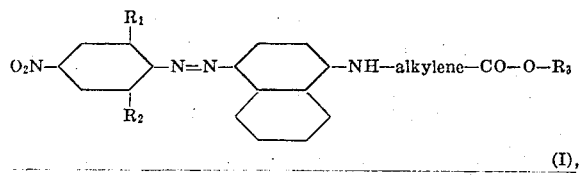

(I), where
R$_1$ stands for chlorine, bromine, cyano or acyl,
R$_2$ for cyano or nitro,
R$_3$ for alkyl or aryl which may bear non-water-solubilizing substituents
and
alkylene for an alkylene radical having two to four carbon atoms.
The alkylene radical is preferably of formula —CH$_2$CH$_2$—, —CH$_2$CH$_2$CH$_2$— or

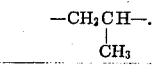

It is preferable for R$_3$ to stand for alkyl with one to eight carbon atoms, which may bear as substituents chlorine, bromine, cyano, thiocyano, hydroxyl, alkoxy (with one to four carbon atoms), phenyl, phenoxy, acyl or acyloxy, or for phenyl which may bear the aforenamed substituents and/or alkyl (with one to four carbon atoms) or nitro.

The aforenamed acyl groups generally correspond to the formula R—Y— or R'—Z—, where
R stands for a hydrocarbon radical which may bear the aforestated substituents and/or contain hetero atoms, preferably an alkyl or phenyl radical,
Y for a radical —O—CO— or —SO$_2$—,
R' for a hydrogen atom or R,
Z for a radical —CO—, —NR''CO— or —NR''SO$_2$—
and
R'' for a hydrogen atom or R.

The water-solubilizing sulphonic acid and carboxylic acid groups are excluded as substituents.

The new compounds are produced by diazotizing an amine of formula

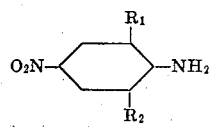

(II)

and coupling the resulting diazonium compound with a compound of formula

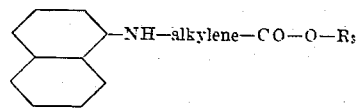

(III)

The compounds of formula (III) can be produced by the known methods, by the addition of acrylic esters on α-naphthylamine in acetic acid solution, at elevated temperature, if necessary in the presence of Lewis acids as catalysts.

The diazotizing and coupling reactions are carried out by the normal methods, some of which have been known for over a hundred years.

The preferred compounds are of formula

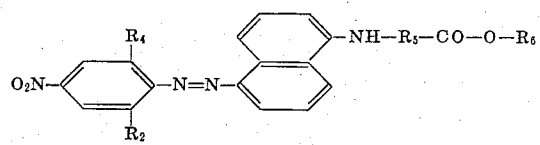

where
R$_2$ stands for cyano or nitro,
R$_4$ for chlorine, bromine, cyano, methylsulphonyl or phenylsulphonyl,
R$_5$ for —CH$_2$CH$_2$—, —CH$_2$CH$_2$CH$_2$— or

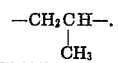

and
R$_6$ for alkyl with one to seven carbon atoms which may bear ethoxy, phenyl or cyano as substituents, or for phenyl or tolyl.

The new compounds of formula (I) are worked up as dyeing preparations by the known methods, such as grinding in the presence of dispersing agents and/or fillers, with subsequent vacuum or injection drying if dry products are desired. After the addition of a suitable volume of water, they can be applied by exhaust dyeing, pad dyeing or printing methods from long or short baths.

From aqueous dispersion the dyes build up powerfully on textiles consisting of synthetic or semi-synthetic hydrophobic substances of high molecular weight. They are especially suitable for the dyeing and printing of textiles of linear aromatic polyesters and of cellulose acetate, cellulose triacetate and synthetic polyamides. They are also dyeable on polyolefins. They are applied by the known methods, as described, e.g., in French Pat. No. 1,445,371.

The dyeings have good all-round fastness. The fastness to light, thermofixation, sublimation and pleating is notable and they show extremely good wet fastness, such as fastness to water, sea water, washing and perspiration, and to solvents, dry cleaning, lubricants, rubbing, cross dyeing, ozone, gas fumes and chlorine. The dyes withstand the conditions of pre-cure and post-cure permanent press finishing and soil release finishes, show good dischargeability and stability to reduction in wool dyeing, and are resistant to hydrolysis in dyeing, notably in high-temperature processes. Wool and cotton are reserved. After a long period of exposure to light the dyeings fade tone-in-tone.

The dyes disclosed herein have higher affinity for polyester fibres than the nearest comparable dyes disclosed in U.S. Pat. No. 2,373,700.

In the following Examples the parts and percentages are by weight and the temperatures in degrees centigrade.

EXAMPLE 1

Seven parts of sodium nitrite are added to 155 parts of concentrated sulphuric acid at 70°, followed at 20° by 100 parts of glacial acetic acid and 26.2 parts of 2-bromo-4,6-dinitroaminobenzene. After 2 hours the diazonium salt solution is combined with a solution of 30 parts of glacial acetic acid, 3 parts of urea and 27.1 parts of 1-[β-(n-butoxycarbonyl)-ethylamino]-naphthalene. The coupling reaction is brought to completion by adjusting the pH to 4 with concentrated sodium acetate solution. The dye settles out and is filtered with suction, washed free of acid and dried. It dyes polyester fibres in blue shades with good fastness properties.

EXAMPLE 2

A diazonium salt solution prepared as in Example 1 is combined with a solution of 28.7 parts of 1-[β-(β'-ethoxyethoxy-carbonyl)-ethylamino]-naphthalene and 3 parts of urea in 40 parts of glacial acetic acid. The pH is adjusted to 4 with concentrated sodium acetate solution and the coupling reaction continued to completion. The dye formed is filtered with suction, dried and recrystallized from alcohol. It gives blue dyeings of good fastness on polyester fibers.

The coupling component used to form the dye of the tabulated Example 3 is prepared as follows: 100 parts of ethyl acrylate and 2 parts of anhydrous zinc chloride are dissolved in 100 parts of glacial acetic acid, 143 parts of α-naphthylamine are added and the solution is held at 95° for 10 hours. After this time the reaction is almost quantitative. On cooling, the solution can be employed immediately for coupling to the dye.

In the following table further dyes of formula (I) are listed, which can be produced in analogy with the preceding Examples. They give dyeings of blue shade on polyester fibres.

TABLE

| Ex. No. | Alkylene | $R_1$ | $R_2$ | $R_3$ |
|---|---|---|---|---|
| 3 | —CH$_2$CH$_2$— | Cl | —NO$_2$ | —C$_3$H$_5$ |
| 4 | —CH$_2$CH$_2$— | Cl | —NO$_2$ | —n-C$_3$H$_7$ |
| 5 | —CH$_2$CH$_2$— | Cl | —NO$_2$ | —iso-C$_3$H$_7$ |
| 6 | —CH$_2$CH$_2$— | Cl | —NO$_2$ | —n-C$_4$H$_9$ |
| 7 | —CH$_2$CH$_2$— | Cl | —NO$_2$ | —C$_2$H$_4$CN |
| 8 | —CH$_2$CH$_2$— | Br | —NO$_2$ | —C$_2$H$_4$CN |
| 9 | —CH$_2$CH$_2$— | —CN | —NO$_2$ | —n-C$_4$H$_9$ |
| 10 | —CH$_2$CH$_2$— | H$_3$C-SO$_2$- | —NO$_2$ | —n-C$_4$H$_9$ |
| 11 | —CH$_2$CH$_2$— | Br | —NO$_2$ | —C$_6$H$_5$ |
| 12 | —CH$_2$CH$_2$— | Br | —NO$_2$ | —C$_6$H$_4$-CH$_3$ |
| 13 | —CH$_2$CH$_2$CH$_2$— | Br | —NO$_2$ | —C$_2$H$_5$ |
| 14 | —CH$_2$CH$_2$CH$_2$— | Cl | —NO$_2$ | —C$_2$H$_5$ |
| 15 | —CH$_2$CH$_2$CH$_2$— | Cl | —NO$_2$ | —CH$_3$ |
| 16 | —CH$_2$CH$_2$CH$_2$— | Br | —NO$_2$ | —CH$_3$ |
| 17 | —CH$_2$CH$_2$— | Br | —NO$_2$ | —C$_2$H$_5$ |
| 18 | —CH$_2$CH$_2$— | Br | —NO$_2$ | —n-C$_3$H$_7$ |
| 19 | —CH$_2$CH$_2$— | Br | —NO$_2$ | —iso-C$_3$H$_7$ |
| 20 | —CH$_2$CH$_2$— | Br | —NO$_2$ | —C$_2$H$_4$CN |
| 21 | —CH$_2$CH$_2$— | Br | —NO$_2$ | —C$_2$H$_4$OC$_2$H$_5$ |
| 22 | —CH$_2$CH$_2$— | Br | —NO$_2$ | -CH$_2$-CH-CH$_2$CH$_3$ | (CH$_2$)$_2$ | CH$_3$ |
| 23 | —CH$_2$CH$_2$— | H$_5$C$_6$-SO$_2$- | —NO$_2$ | —n-C$_4$H$_9$ |
| 24 | —CH$_2$CH$_2$— | Cl | —CN | —C$_2$H$_5$ |
| 25 | —CH$_2$CH$_2$— | Br | —NO$_2$ | —n-C$_4$H$_9$ |
| 26 | —CH$_2$CH$_2$— | —CN | —NO$_2$ | —C$_2$H$_5$ |
| 27 | —CH$_2$CH$_2$— | —CN | —NO$_2$ | —n-C$_4$H$_9$ |
| 28 | —CH$_2$CH$_2$— | —SO$_2$CH$_3$ | —NO$_2$ | —n-C$_4$H$_9$ |
| 29 | —CH$_2$CH$_2$— | —SO$_2$CH$_3$ | —CN | —C$_2$H$_5$ |
| 30 | —CH$_2$CH$_2$— | —SO$_2$CH$_3$ | —CN | —CH(CH$_3$)$_2$ |
| 31 | —CH$_2$CH$_2$— | Br | —CN | —CH(CH$_3$)$_2$ |
| 32 | —CH$_2$CH$_2$— | Br | —CN | —C$_2$H$_5$ |
| 33 | —CH$_2$CH$_2$— | Br | —CN | —(CH$_2$)$_3$CH$_3$ |
| 34 | —CH$_2$CH$_2$— | —CN | —CN | —(CH(CH$_3$)$_2$ |
| 35 | —CH$_2$—CH— | CH$_3$ | Cl | —NO$_2$ | —n-C$_4$H$_9$ |
| 36 | —CH$_2$—CH— | CH$_3$ | Br | —NO$_2$ | —n-C$_4$H$_9$ |
| 37 | —CH$_2$CH$_2$— | Br | —NO$_2$ | —CH$_2$C$_6$H$_5$ |

Formulae of representative dyestuffs of the foregoing Examples are as follows:

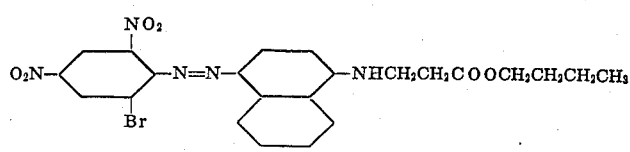

Example 1,

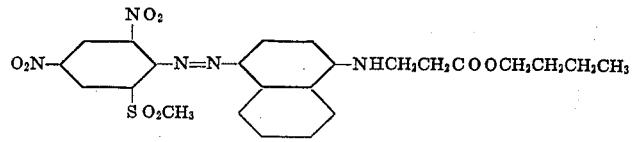

Example 10,

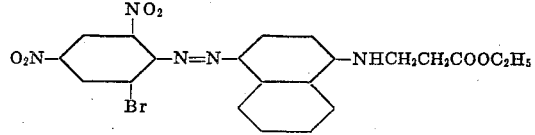

Example 17,

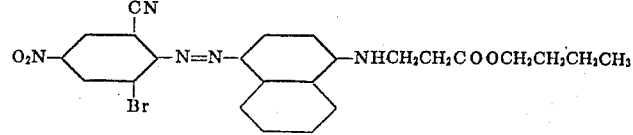

Example 25,

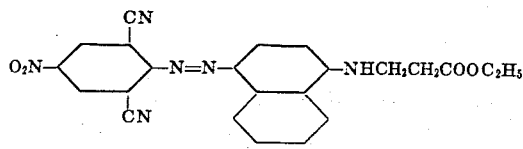

and

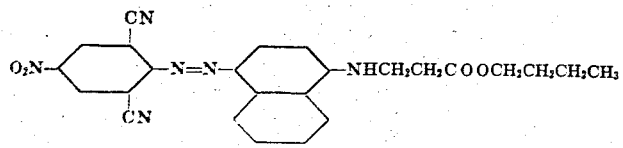

Example 26.

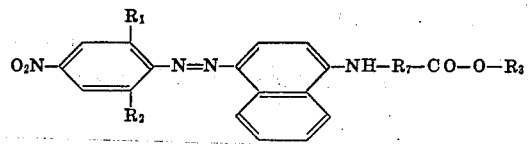

Example 27.

Having thus disclosed the invention what I claim is:

1. A compound of the formula

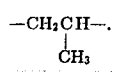

wherein
  $R_1$ is chloro, bromo, cyano, methylsulfonyl or phenylsulfonyl,
  $R_2$ is cyano or nitro,
  $R_3$ is alkyl of one to eight carbon atoms, monosubstituted alkyl of one to eight carbon atoms wherein the substituent is alkoxy of one to four carbon atoms, cyano or phenyl, phenyl or tolyl, and
  $R_7$ is straight or branched chain alkylene of two to four carbon atoms, with the proviso that the $-NH-$ and $-CO-O-R_3$ groups are not joined to the same carbon atom.

2. A compound according to claim 1 wherein
  $R_3$ is alkyl of one to seven carbon atoms, monosubstituted alkyl of one to seven carbon atoms, wherein the substituent is ethoxy, phenyl or cyano, phenyl or tolyl, and
  $R_7$ is $-CH_2CH_2-$, $-CH_2CH_2CH_2-$ or
  $$-CH_2CH-\atop\phantom{-}CH_3.$$

3. A compound according to claim 2 wherein
  $R_3$ is alkyl of one to seven carbon atoms, 2-ethoxyethyl, 2-cyanoethyl, benzyl, phenyl or p-tolyl.

4. A compound according to claim 3 wherein
  $R_3$ is alkyl of one to seven carbon atoms, and
  $R_7$ is $-CH_2CH_2-$.

5. The compound according to claim 3 of the formula

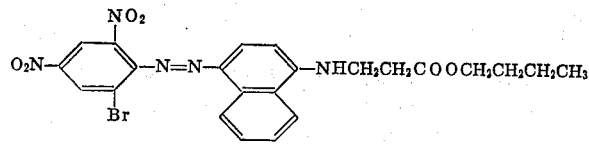

6. The compound according to claim 3 of the formula

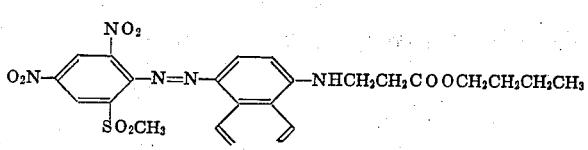

7. The compound according to claim 3 of the formula

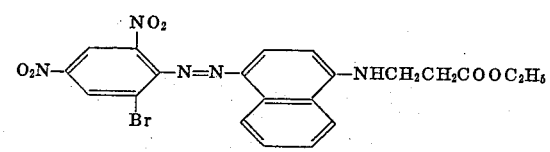

8. The compound according to claim 3 of the formula

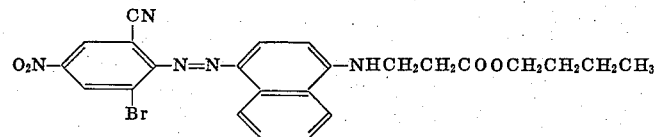

9. The compound according to claim 3 of the formula

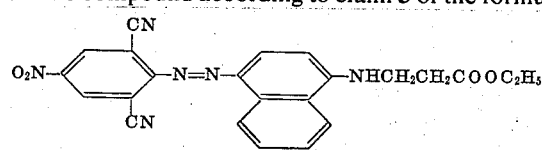

10. The compound according to claim 3 of the formula

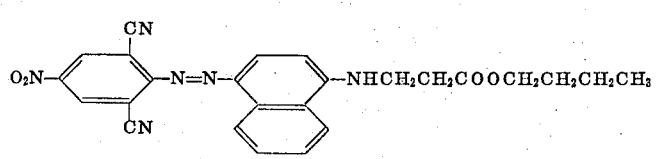

* * * * *